(12) United States Patent
Tai et al.

(10) Patent No.: US 11,481,586 B2
(45) Date of Patent: *Oct. 25, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Yongmin Tai, Suwon-Si (KR); Insang Cho, Suwon-Si (KR); Chanyoung Hwang, Suwon-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,070

(22) Filed: Oct. 5, 2021

(65) Prior Publication Data

US 2022/0027663 A1    Jan. 27, 2022

Related U.S. Application Data

(63) Continuation of application No. 17/081,510, filed on Oct. 27, 2020.

(30) Foreign Application Priority Data

Nov. 21, 2019   (KR) .......................... 10-2019-0150746

(51) Int. Cl.
*G06K 9/62* (2022.01)
*G06N 3/04* (2006.01)
(Continued)

(52) U.S. Cl.
CPC ........... *G06K 9/627* (2013.01); *G06K 9/6256* (2013.01); *G06N 3/0454* (2013.01); *G06N 3/08* (2013.01);
(Continued)

(58) Field of Classification Search
CPC .... G06K 9/627; G06K 9/6256; G06N 3/0454; G06N 3/08; G06N 3/02; G06T 3/40;
(Continued)

(56) References Cited

U.S. PATENT DOCUMENTS 8,009,921 B2 * 8/2011 Csurka ..................... G06T 11/60
382/228
9,953,248 B2 * 4/2018 Cho ....................... G06K 9/4642
(Continued)

FOREIGN PATENT DOCUMENTS

JP          3767189 B2    4/2006
JP       2018-146648 A    9/2018
(Continued)

OTHER PUBLICATIONS

Dodge, Samuel et al., "Quality Resilient Deep Neural Networks", arXiv:1703.08119v1 [cs.CV] Mar. 23, 2017, pp. 1-9.*
(Continued)

*Primary Examiner* — Samir A Ahmed
(74) *Attorney, Agent, or Firm* — Sughrue Mion, PLLC

(57) ABSTRACT

An electronic apparatus may include a memory that stores first information regarding a plurality of first artificial intelligence models trained to perform image processing differently from each other and second information regarding a second artificial intelligence model trained to identify a type of an image by predicting a processing result of the image by each of the plurality of first artificial intelligence models. The electronic apparatus may further include a processor configured to identify a type of an input image by inputting the input image to the second artificial intelligence model stored in the memory, and process the input image by inputting the input image to one of the plurality of first intelligence models stored in the memory based on the identified type.

16 Claims, 13 Drawing Sheets

(51) Int. Cl.
   *G06N 3/08* (2006.01)
   *G06T 3/40* (2006.01)
   *G06T 7/00* (2017.01)

(52) U.S. Cl.
   CPC .............. *G06T 3/40* (2013.01); *G06T 7/0002* (2013.01); *G06T 2207/20081* (2013.01); *G06T 2207/20084* (2013.01); *G06T 2207/30168* (2013.01); *G06T 2207/30201* (2013.01)

(58) Field of Classification Search
   CPC ......... G06T 7/0002; G06T 2207/20081; G06T 2207/20084; G06T 2207/30168; G06T 2207/30201; G06T 2207/20076
   See application file for complete search history.

(56) References Cited

U.S. PATENT DOCUMENTS

| | | | |
|---|---|---|---|
| 10,133,987 B2 | 11/2018 | Mitola, III | |
| 10,360,494 B2 | 7/2019 | Wang et al. | |
| 2005/0129306 A1 | 6/2005 | Wang et al. | |
| 2011/0142330 A1 | 6/2011 | Min et al. | |
| 2016/0210536 A1* | 7/2016 | Cho | G06K 9/4642 |
| 2018/0101957 A1 | 4/2018 | Talathi | |
| 2018/0122048 A1 | 5/2018 | Wang et al. | |
| 2018/0181796 A1* | 6/2018 | Wang | G06T 7/0002 |
| 2018/0189615 A1* | 7/2018 | Kang | G06K 9/6202 |
| 2018/0336226 A1* | 11/2018 | Anorga | G06N 20/00 |
| 2018/0342044 A1 | 11/2018 | Lutz et al. | |
| 2019/0080239 A1 | 3/2019 | Yang | |
| 2019/0130474 A1* | 5/2019 | Tsujibe | G06Q 50/04 |
| 2019/0251402 A1 | 8/2019 | Godwin, IV et al. | |
| 2019/0318207 A1* | 10/2019 | Lo | G06K 9/6267 |
| 2020/0211172 A1* | 7/2020 | Nam | G06T 5/003 |
| 2020/0273570 A1* | 8/2020 | Subramanian | G06N 7/005 |
| 2020/0365239 A1* | 11/2020 | Sabharwal | G06N 3/0445 |
| 2020/0394388 A1 | 12/2020 | Xiong et al. | |
| 2021/0150192 A1 | 5/2021 | Han et al. | |

FOREIGN PATENT DOCUMENTS

| | | |
|---|---|---|
| JP | 2019-025044 A | 2/2019 |
| KR | 101890207 B1 | 8/2018 |
| KR | 2019-0030034 A | 3/2019 |
| KR | 10-2019-0103047 A | 9/2019 |
| KR | 10-2114273 B1 | 5/2020 |
| KR | 10-2021-0061146 A | 5/2021 |
| WO | 2019102476 A1 | 5/2019 |

OTHER PUBLICATIONS

International Search Report (PCT/ISA/210) and Written Opinion (PCT/ISA/237) dated Feb. 10, 2021 issued by the International Searching Authority in International Application No. PCT/KR2020/014456.
Communication dated Apr. 12, 2021 issued by the European Patent Office in application No. 20202755.3.

* cited by examiner

Votre peau vous parle  Votre peau vous parle

FIG. 6

| App. (@840MHz) | Quantization | Instruction | FPS | Bandwidth |
|---|---|---|---|---|
| inception_v1(pruned) | 8bit | 71,112 | 154.15 | 7.704 M Bytes |
| mobilenet_v1(pruned) | 8bit | 10,240 | 418.35 | 3.392 M Bytes |

ELECTRONIC APPARATUS AND CONTROLLING METHOD THEREOF

CROSS-REFERENCE TO RELATED APPLICATIONS

This application is a continuation of U.S. patent application Ser. No. 17/081,510, filed on Oct. 27, 2020, which claims priority from Korean Patent Application No. 10-2019-0150746, filed in the Korean Intellectual Property Office on Nov. 21, 2019, the disclosure of which is incorporated herein by reference.

BACKGROUND

1. Field

Aspects of exemplary embodiments of the present disclosure relate to an electronic apparatus and a controlling method thereof and more particularly, to an electronic apparatus that processes an input image using an artificial intelligence model and a controlling method thereof.

2. Description of the Related Art

Recently, an electronic apparatus may perform image processing using a neural network technology which is represented by deep learning that has been developed rapidly. For example, the neural network technology may be applied to segmentation, super-resolution, HDR, etc.

Such a neural network technology may be implemented in the form of an embedded system as shown in FIG. 1A in consideration of delay time. However, because of a limited computing resource, neural network algorithms may be optimized, but they do not reflect all the characteristics of inputs. Specifically, if a single neural network model is applied to all inputs, desired results may not be produced for all inputs. In other words, according to the characteristics of an input image, side effects may be generated together with a desired image quality improvement(s).

For example, as illustrated in FIG. 1A, in the case of a neural network-based super resolution model trained as a general image, a result without side effects may be obtained in the general image.

However, as illustrated in FIG. 1C, various side effects (e.g., jagging or blurring) may be generated in an image with text.

Due to such side effects, applying the same neural network model to all inputs is a problem in neural network technology.

In order to resolve such a problem, after the neural network processing, there may be a method of adding a module for sensing and improving side effects. Alternatively, there may be a method of storing neural network model information to be used for various input images and providing the same to an embedded system.

However, in the former "sensing" case, the side effects of an image (e.g., after upscaling) should be sensed and eliminated, but the method is not appropriate in an environment where computing resources are limited. In the latter "storing" case, there is a problem that there is no way of processing when there is no information in the input image.

SUMMARY

The present disclosure is provided in accordance with the above-described needs, and aims at providing an electronic apparatus for improving the processing performance of an input image by changing a processing method according to the type of the input image and controlling method thereof.

An electronic apparatus according to an embodiment of the disclosure may include a memory in which information regarding a plurality of first artificial intelligence model trained to perform image processing differently each other and information regarding a second artificial intelligence model trained to identify a type of an image by predicting a processing result of the image by each of the plurality of first artificial intelligence models is stored and a processor configured to be connected to the memory and to control the electronic apparatus, and the processor is configured to identify a type of an input image by inputting the input image to the second artificial intelligence model, and process the input image by inputting the input image to one of the plurality of first intelligence models based on the identified type.

According to an embodiment of the disclosure, a controlling method of an electronic apparatus may include identifying a type of an input image by inputting the input image to a second artificial intelligence model trained to identify a type of an image by predicting an image processing result by each of a plurality of first artificial intelligence models trained to perform image processing differently each other and processing the input image by inputting the input image to one of the plurality of first artificial intelligence models based on the identified type.

According to an embodiment of the disclosure, an electronic apparatus may include a memory that stores first information regarding a plurality of first artificial intelligence models trained to perform image processing differently from each other and second information regarding a second artificial intelligence model trained to identify a type of an image by predicting a processing result of the image by each of the plurality of first artificial intelligence models, and a processor connected to the memory and configured to: identify a type of an input image by inputting the input image to the second artificial intelligence model, and process the input image by inputting the input image to one of the plurality of first intelligence models based on the identified type.

The processor may be further configured to down-scale a resolution of the input image and identify a type of the input image by inputting the down-scaled input image to the second artificial intelligence model.

The processor may be further configured to, based on a size of the original image being equal to or greater than a predetermined size, down-scale the original image to obtain the input image, and identify a type of the original image by inputting the down-scaled input image to the second artificial intelligence model.

The second artificial intelligence model may be an artificial intelligence model obtained by training a relationship between a plurality of sample images and a type corresponding to each sample image through an artificial intelligence algorithm.

Each of the plurality of first artificial intelligence models may be an artificial intelligence model obtained by training a relationship between a sample image of a type corresponding to each of the plurality of first artificial intelligence models from among the plurality of sample images and the original image corresponding to the sample image through an artificial intelligence algorithm.

The type corresponding to each sample image may be obtained by processing each of the plurality of sample images by inputting each of the plurality of sample images to one of the plurality of first artificial intelligence models, and obtained based on a type of a side effect of each of the processed plurality of sample images.

The type of a side effect may include at least one of none, jagging, blurring, aliasing, or noise boosting.

The processing the input image may include at least one of up-scaling processing, noise removing processing or detail enhancement processing.

The processor may be further configured to obtain a weighted value regarding a plurality of types related to the input image by inputting the input image to the second artificial intelligence model, and identify a type having a largest weighted value from among the plurality of types as a type of the input image.

The processor may be further configured to, based on at least one of weighted values regarding the plurality of types being equal to or greater than a threshold value, store the input image and the at least one weighted value in the memory.

The processor may include a central processing unit (CPU) and a Neural Processing Unit (NPU) which operate based on an Operating System, wherein the CPU is configured to identify the type of the input image by inputting the input image to the second artificial intelligence model, and wherein the NPU is configured to process the input image by inputting the input image to one of the plurality of first artificial intelligence models based on the identified type.

According to an embodiment, a method of controlling an electronic apparatus may comprise: identifying a type of an input image by inputting the input image to a second artificial intelligence model trained to identify a type of an image by predicting an image processing result by each of a plurality of first artificial intelligence models trained to perform image processing differently from each other; and processing the input image by inputting the input image to one of the plurality of first artificial intelligence models based on the identified type.

According to an embodiment, a non-transitory computer readable medium storing computer program code, which, when executed by a processor, may cause the processor to perform a method of a method that includes: identifying a type of an input image by inputting the input image to a second artificial intelligence model trained to identify a type of an image by predicting an image processing result by each of a plurality of first artificial intelligence models trained to perform image processing differently from each other; and processing the input image by inputting the input image to one of the plurality of first artificial intelligence models based on the identified type.

According to an embodiment, a computer-implemented method of training a neural network for image processing may comprise: collecting a set of digital sample images from a database; inputting the collected set of digital facial images into a plurality of first neural network models, so as to obtain a plurality of outputs, wherein the plurality of first neural network models are trained to perform image processing differently from each other; training, in a second neural network model, relationships between the set of digital sample images and a side effect type corresponding to each digital sample image using the obtained plurality of outputs, wherein the side effect type corresponds to a side effect of processing by a respective one of the plurality of first neural network models.

The computer-implemented method may further comprise: identifying a side effect type of an input digital image by inputting the input digital image to the second artificial intelligence model, and processing the input digital image by inputting the input digital image to one of the plurality of first intelligence models that corresponds to the identified defect type.

According to the various embodiments of the present disclosure, the electronic apparatus may identify the type of an input image using an artificial intelligence model, and improve processing performance of the input image by processing the input image using another artificial intelligence model corresponding to the identified type.

BRIEF DESCRIPTION OF THE DRAWINGS

The above and other aspects, features, and advantages of certain example embodiments of the disclosure will be more apparent from the following description taken in conjunction with the accompanying drawings, in which:

FIG. 6 is a view provided to explain real time computation according to an embodiment;

DETAILED DESCRIPTION

Figure 1A:
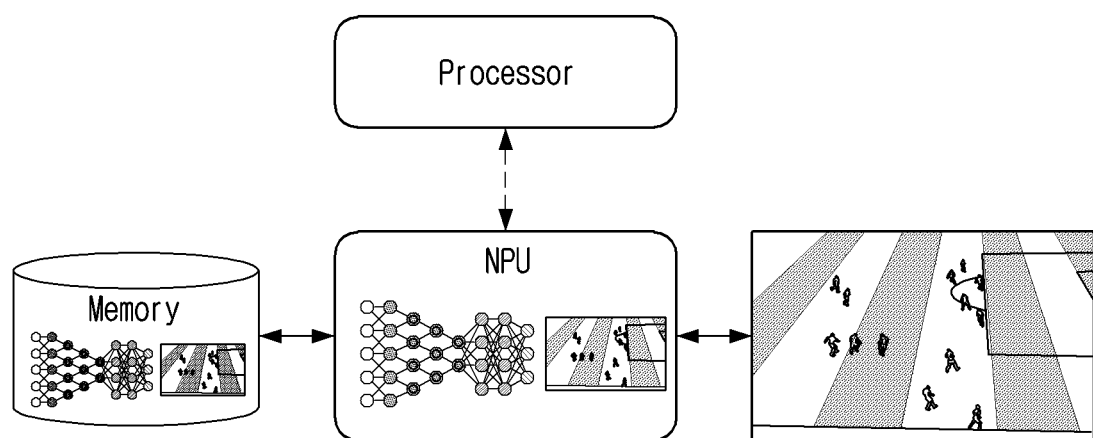
FIG. 1A is a view provided to explain a problem of a conventional technology.
Figure 1B:
FIG. 1B is a view provided to explain a problem of a conventional technology.
Figure 1B:
Figure 1B:
Figure 1C:
FIG. 1C is a view provided to explain a problem of a conventional technology.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the present disclosure will be described in detail with reference to the accompanying drawings.

As for the terms used in the embodiments of the disclosure, general terms that are currently used widely were selected in consideration of the functions described in the disclosure. However, the terms may vary depending on the intention of those skilled in the art who work in the pertinent field, previous court decisions or emergence of new technologies. Also, in particular cases, there may be terms that were designated by the applicant, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

In the present disclosure, the terms "include" and "comprise" designate the presence of corresponding features (e.g., components, such as, numbers, functions, operations, parts, etc.), but do not exclude the presence of additional features.

In the present disclosure, the term "at least one of A or/and B" should be understood to mean any one of "A", "B", or "A and B."

Expressions "first", "second", or the like, used in the disclosure may indicate various components regardless of a sequence and/or importance of the components, will be used only in order to distinguish one component from the other components, and do not limit the corresponding components.

Singular forms are intended to include plural forms unless the context clearly indicates otherwise. In the present disclosure, the terms "include" and "comprise" designate the presence of features, numbers, steps, operations, components, elements, or a combination thereof that are written in the present disclosure, but do not exclude the presence or possibility of addition of one or more other features, numbers, steps, operations, components, elements, or a combination thereof.

In the present disclosure, the term "user" may refer to a person who uses an electronic apparatus or a device itself (e.g., an electronic device) using an electronic apparatus (e.g., an artificial intelligence electronic apparatus).

Hereinafter, an embodiment of the present disclosure will be described in greater detail with reference to the accompanying drawings.

Figure 2:
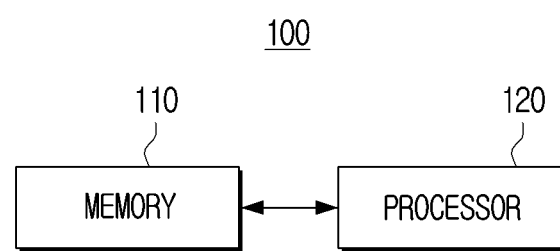
FIG. 2 is a block diagram illustrating configuration of an electronic apparatus according to an embodiment.

FIG. 2 is a block diagram illustrating configuration of an electronic apparatus 100 according to an embodiment.

The electronic apparatus 100 may be an apparatus for processing an input image. Referring to FIG. 2, the electronic apparatus 100 may include a memory 110 and a processor 120. The electronic apparatus may further comprise a display. The electronic apparatus may process the image directly. The electronic apparatus may be an electronic device, such as, a television (TV), a desktop personal computer (PC), a notebook PC, a digital video disk (DVD) player, a smart phone, a tablet PC, a monitor, smart glasses, a smart watch, etc. Alternatively, the electronic apparatus 100 may be an apparatus without a display. The electronic apparatus 100 may further comprise a communication interface, which may be controlled to transmit a processed image to a display device, such as, a monitor, a set-top box (STB), a speaker, a computer main body, etc. However, the electronic apparatus 100 is not limited thereto, and may be any apparatus capable of processing an input image. The communication interface may be configured to perform communication with a server, a user terminal, etc. The performed communication may be via a network or a short range communication method that does not require a network.

However, the electronic apparatus 100 is not limited thereto, and may be implemented in a form in which some components are excluded.

The memory 110 may store various artificial intelligence models. For example, the memory 110 may store information on a plurality of first artificial intelligence models trained to perform image processing differently from each other and information on a second artificial intelligence model trained to identify a type of an image by predicting an image processing result regarding each of the plurality of first intelligence models.

In the present disclosure, the plurality of first artificial intelligence models may be artificial intelligence models for performing a same type of image processing. In this regard, the first artificial intelligence models may be, for example, artificial intelligence models for performing up-scaling of an image. However, the plurality of first artificial intelligence models are artificial intelligence models for performing image processing differently from each other and, for example, the plurality of first artificial intelligence models may have different methods for performing up-scaling of an image. In addition, the image processing method of the plurality of first artificial intelligence methods may be different according to the type of an image. For example, optimal image processing may be performed when an image of the first type is processed by one of the first artificial intelligence models, and optimal image processing may be performed when an image of the second type is processed by another one of the first artificial intelligence models.

The second artificial intelligence model may be an artificial intelligence model for identifying the type of an image (to be processed). The number of types of images may be preset, or the second artificial intelligence model may be trained to determine an input image as one of the preset number of types of images. For example, the second artificial intelligence model may be implemented as a Mobilenet model or an Inception model that perform fast classification. In addition, the second artificial intelligence model may be implemented in a simple structure in comparison with a plurality of first artificial intelligence models to improve the speed of performing computation.

The memory 110 may store a plurality of input images and an input image processed by one of a plurality of first artificial intelligence models. In addition, the memory 110 may store an input training image to be used to train at least one of the plurality of first artificial intelligence models or the second artificial intelligence model.

The memory 110 may be implemented as a non-volatile memory, a volatile memory, etc., but is not limited thereto. For example, a hard disk drive (HDD) or a solid state drive (SSD) may be used as the memory 110, and any element capable of storing electronic data can be used as the memory 110.

The processor 120 may control the overall operations of the electronic apparatus 100. Specifically, the processor 120 may be connected to each element of the electronic apparatus 100 and control the overall operations of the electronic apparatus 100. For example, the processor 120 may be connected to the memory 110, a display, and a communication interface, etc. and control the operations of the components of the electronic apparatus 100.

According to an embodiment, the processor 120 may be implemented as a digital signal processor (DSP), a microprocessor, or a time controller (TCON). However, the processor 120 is not limited thereto, and the processor 120 may include one or more of a central processing unit (CPU), a micro controller unit (MCU), a micro processing unit (MPU), a controller, an application processor (AP), a communication processor (CP), or an Advanced RISC (Reduced Instruction Set Computing) Machine (ARM) processor, or may be defined as the corresponding term. In addition, the processor 120 may be implemented by a system-on-chip (SoC) or a large scale integration (LSI) in which a processing algorithm is embedded, or may be implemented in a field programmable gate array (FPGA) form.

The processor 120 may identify a type of an input image by inputting the input image to the second artificial intelligence model. The type of the input image may be preset. For example, the type of the input image may be divided into five types from a first type to a fifth type, and the processor 120 may input the input image to the second artificial intelligence model to classify the input image as one of the first to fifth types. Here, the number of types of image may be the same as the number of the plurality of first artificial intelligence models.

The processor 120 may process the input image by inputting the input image to at least one of the plurality of first artificial intelligence models based on the identified type. For example, based on the type of the input image being the third type, the processor 120 may process the input image by inputting the input image to a third one of the first artificial intelligence models, the third one of the first artificial intelligence models corresponding to the third type from among the plurality of first artificial intelligence models.

The processor 120 may down-scale a resolution of an input image and then, identify the type of the input image by inputting the down-scaled image to the second artificial intelligence model. For example, the processor 120 may convert an input image having an Ultra-high-definition (UHD) resolution into an image having a standard definition (SD) resolution, and input the converted image to the second artificial intelligence model to identify the type of the input image. Through such an operation, the computation time for identifying the capacity of the second artificial intelligence model and the type of the input image may be reduced.

Based on the size of the input image being equal to or greater than a predetermined size, the processor 120 may down-scale the input image and input the down-scaled image to the second artificial intelligence model to identify the type of the input image. For example, based on the input image having a UHD resolution, the processor 120 may convert the input image to an image having an SD resolution and input the converted image to the second artificial intelligence model to identify the type of the input image. Based on the input image having an HD resolution, the processor 120 may not convert the resolution of the input image, and input the input image to the second artificial intelligence model to identify the type of the input image.

Meanwhile, the second artificial intelligence model may be an artificial intelligence model which is obtained by training the relationship between a plurality of sample images and a type corresponding to each sample image through an artificial intelligence algorithm. A plurality of sample images may be obtained by down-scaling each of a plurality of original images. In addition, the type corresponding to each sample image may be obtained by inputting each of the plurality of sample images to one of the plurality of first artificial intelligence models. For example, the type corresponding to each sample image may be obtained by processing each of the plurality of sample images by inputting each of the plurality of sample images to one of the plurality of first artificial intelligence models, and obtaining the type corresponding to each sample image based on the type of a side effect of each of the plurality of processed sample images. Here, the type of side effects may include at least one of none, jagging, blurring, aliasing, or noise boosting.

Meanwhile, each of the plurality of first artificial intelligence models may be an artificial intelligence model which is obtained by training the relationship between a simple image of a type corresponding to each of the plurality of first artificial intelligence models from among a plurality of sample images and an original image corresponding to the sample image through an artificial intelligence algorithm. For example, one of the first artificial intelligence models may be an artificial intelligence model which is obtained by training the relationship between a sample image of the first type and a corresponding original image through an artificial intelligence algorithm, and another one of the first artificial intelligence models may be an artificial intelligence model which is obtained by training the relationship between a sample image of the second type and a corresponding original image through an artificial intelligence algorithm.

Meanwhile, the same type of image processing may include at least one of up-scaling processing, noise removing processing or detail enhancement processing. For example, the processor 120 may use one of the plurality of first artificial intelligence models to perform up-scaling processing with respect to an input image. Here, the plurality of first artificial intelligence models are artificial intelligence models for performing up-scaling, but the image processing method may vary according to the type of the image.

However, the present disclosure is not limited thereto, and the same type of image processing may include different image processing.

Meanwhile, the processor 120 may obtain a weighted value regarding a plurality of types related to an input image by inputting the input image to the second artificial intelligence model, and identify the type having the largest weighted value from among the plurality of types as the type of the input image. For example, the processor 120 may input the input image to the second artificial intelligence model and obtain a result of the first type having the weighted value of 80, the second type having the weighted value of 20, and the third type having the weighted value of 40, and may identify the first type having the largest weighted value of 80 as the type of the input image. In the above, the weighted value is represented as a score, but this is only an example. For example, the weighted value may be represented as a probability value.

Based on at least one of one of the weighted values regarding the plurality of types being equal to or greater than a threshold value, the processor 120 may store the input image and the at least one weighted value in the memory 110. If it is assumed that the threshold value is 70 in the above example, the processor 120 may store the input image and the information that the input image is the first type in the memory 110. Subsequently, the processor 120 may transmit the input image and the information that the input image is the first type to a server. The server may update the plurality of first artificial intelligence models and the second artificial intelligence model based on the received information, which will be explained in detail later.

Meanwhile, the processor 120 may include heterogeneous processing units. For example, the processor 120 may include a processing unit and a neural processing unit (NPU) that operate based on an operating system such as a central processing unit (CPU).

The NPU may be a processor dedicated for neural computation, and may include a plurality of processing elements.

One-way shift or two-way shift of data is possible between adjacent processing or computation elements of the NPU.

Each of the computation elements may basically include a multiplier and an Arithmetic Logic Unit (ALU), and the ALU may include at least one adder. The computation element may perform arithmetic operations using a multiplier and an ALU. However, the present disclosure is not limited thereto, and may be formed in any other structures as long as it can perform functions such as arithmetic operations, shifts, etc. In addition, each of the computation elements may include a register for storing data.

If the processor 120 includes a processing unit and an NPU that operate based on an operating system, the processing unit may identify the type of an input image by inputting the input image to the second artificial intelligence model, and the NPU may process the input image by inputting the input image to one of a plurality of first artificial intelligence models based on the identified type.

However, the present disclosure is not limited thereto, and the processor 120 may further include a processing unit dedicated for signal processing such as a Digital Signal Processor (DSP), a Graphics Processing Unit (GPU), etc. In this case, the processing unit dedicated for signal processing such as a DSP may identify the type of an input image by inputting the input image to the second artificial intelligence model, and the NPU may process the input image by inputting the input image to one of the plurality of first artificial intelligence models.

Meanwhile, functions related to artificial intelligence according to an embodiment are operated through the processor 120 and the memory 110.

The processor 120 may consist of one or a plurality of processors. In this case, the one or a plurality of processors may be a general purpose processor such as a CPU, an AP, a DSP, etc., a processor dedicated for graphics such as a GPU and a Vision Processing Unit (VPU), or a processor dedicated for artificial intelligence such as an NPU.

One or a plurality of processors may control to process input data according to a predefined operation rule or an artificial intelligence model stored in the memory 110. Alternatively, based on one or a plurality of processors being a processor dedicated for artificial intelligence, the processor dedicated for artificial intelligence may be designed in a hardware structure specialized for processing a specific artificial intelligence model. The predefined operation rule or the artificial intelligence model is characterized by being made through training.

Here, being made through training means that as the artificial intelligence model is trained using a plurality of pieces of learning data by a learning algorithm, a predefined operation rule or an artificial intelligence model set to perform a desired feature (or purpose) is made. Such training may be conducted in an apparatus itself where artificial intelligence is performed or through a separate server and/or system. The examples of the learning algorithm include supervised learning, unsupervised learning, semi-supervised learning or reinforcement learning, but are not limited thereto.

The artificial intelligence model may comprise or consist of a plurality of neural network layers. Each of the plurality of neural network layers may have a plurality of weighted values and may perform a neural network operation through computation between a computation result of the previous layers and the plurality of weighted values. The plurality of weighted values of the plurality of neural network layers may be optimized by a learning result of an artificial intelligence model. For example, the plurality of weighted values may be updated to reduce or minimize a loss value or a cost value obtained in an artificial intelligence model during a learning process.

The artificial neural network may include a Deep Neural Network (DNN). For example, the artificial neural network may include a Convolutional Neural Network (CNN), Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Network (GAN), a Deep Q-Network, etc., but is not limited thereto.

Meanwhile, the electronic apparatus 100 may further include a display and a communication interface.

The display may be implemented in various types of displays such as a monitor, a projector, a Liquid Crystal Display (LCD), an Organic Light Emitting Diodes (OLED) display, a Plasma Display Panel (PDP), a micro Light Emitting Diode (LED), Laser Display, virtual reality (VR) device, an augmented reality (AR) device, Glasses, etc. The display may also include a driving circuit, a backlight unit, etc. which can be implemented in the form of a Thin-film transistor (TFT), such as, an a-si TFT, a low temperature poly silicon (LTPS) TFT, an organic TFT (OTFT), etc. Meanwhile, the display may be implemented as a touch screen display, a flexible display, three-dimensional (3D) display, etc. combined with a touch sensor.

The communication interface may be configured to perform communication with various types of external devices according to various types of communication methods. The communication interface may include a Wireless Fidelity (WiFi) module, a Bluetooth module, an infrared communication module, a wireless communication module, etc. Here, each communication module may be implemented in the form of at least one hardware chip.

The processor may perform communication with various external devices using the communication interface. Here, the external devices may include a server, a Bluetooth earphone device, a display device, etc.

The WiFi module and the Bluetooth module may perform communication in a WiFi method and a Bluetooth method, respectively. In the case of using the WiFi module or the Bluetooth module, various connection information such as a service set identifier (SSID), a session key, etc. may be transmitted and received first, and communication may be established by using this, and then various kinds of information may be transmitted and received.

The infrared communication module may perform communication according to an Infrared Data Association (IrDA) technology using infrared light which lies between visible light and millimeter waves for short-distance wireless data transmission.

The wireless communication module may include at least one communication chip that performs communication according to various wireless communication standards such as Zigbee, 3rd generation (3G), 3rd generation partnership project (3GPP), long term evolution (LTE), LTE Advanced (LTE-A), 4th generation (4G), and 5th generation (5G), other than the above-described communication methods.

In addition, the communication interface may include at least one of a local area network (LAN) module, an Ethernet module, or a wired communication module performing communication by using a pair cable, a coaxial cable, an optical fiber cable, or the like.

The communication interface may further include an input/output interface. The input/output interface may be one of High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), and Digital Visual Interface (DVI).

The input/output interface may input/output at least one of an audio signal or a video signal.

According to an embodiment, the input/output interface may include a port for inputting/outputting only an audio signal and a port for inputting/outputting only a video signal separately, or may be implemented as one port that inputs/outputs both an audio signal and a video signal.

As described above, the electronic apparatus may identify the type of an input image using an artificial intelligence model, and improve the processing performance of the input image by adaptively processing the input image using another artificial intelligence model corresponding to the identified type.

Hereinafter, the operation of the processor 120 will be described in greater detail using various drawings.

Figure 3:
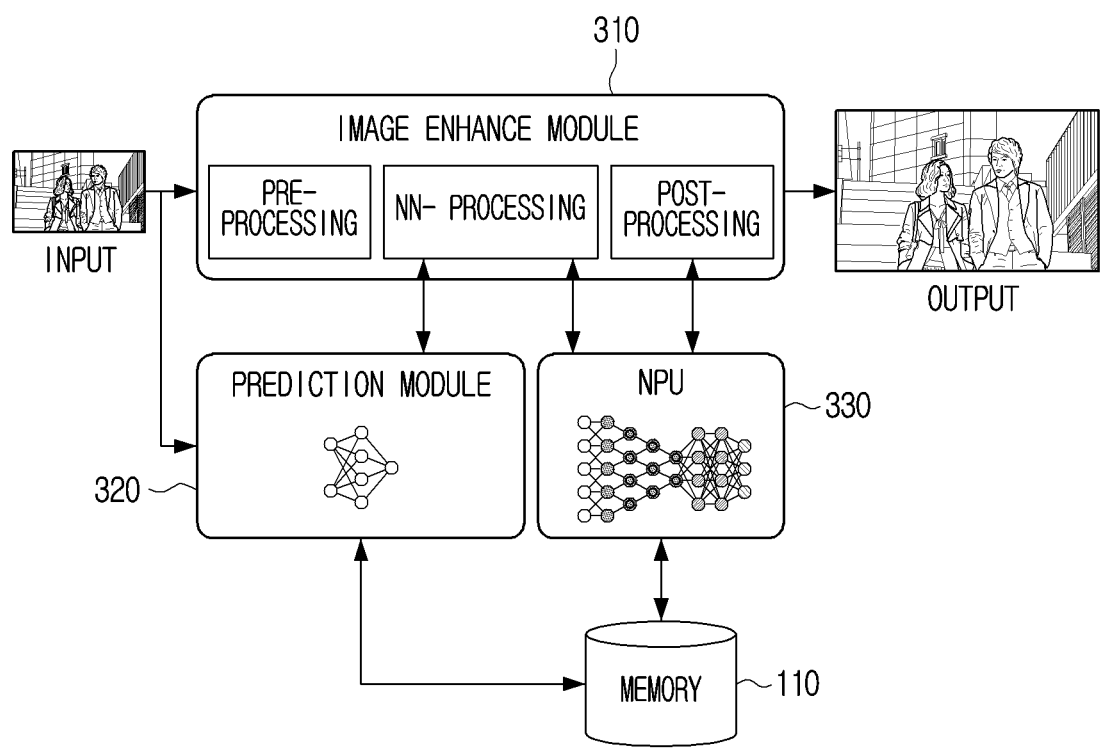
FIG. 3 is a view provided to explain an operation of a processor according to an embodiment.

FIG. 3 is a view provided to explain an operation of a processor 120 according to an embodiment.

An image enhancing (processing) module 310 may be performed by a CPU or a DSP. A prediction module 320 may be performed by one of a CPU, a DSP or an NPU.

First of all, the prediction module 320 may identify the type of the input image by inputting the input image to the second artificial intelligence model. In this case, the prediction module 320 may down-scale the input image, and identify the type by inputting the down-scaled image to the second artificial intelligence model. The prediction module 320 may determine whether to perform down-scaling based on at least one of the resolution, capacity and extension of the input image. Here, the input image and the second artificial intelligence model may be provided from the memory 110.

An NPU 330 may perform a neural network operation by inputting the input image to the second artificial intelligence model, and output the image type as a result.

An image processing module 310 may perform pre-processing with respect to the input image. For example, the image processing module 310 may scale the resolution of the input image to correspond to a plurality of first artificial intelligence models. Alternatively, the image processing module 310 may change the data type of the input image to corresponding to the input format of the NPU.

The image processing module 310 may process the input image by inputting the input image to one of the plurality of first artificial intelligence models. Here, the input image and one of the plurality of first artificial intelligence models may be provided from the memory 110.

The NPU may perform Neural Network (NN)-processing by inputting the input image to one of the plurality of first artificial intelligence models, and output the image-processed input image as a result.

The image processing module 310 may perform post-processing with respect to the image-processed input image. For example, the image processing module 310 may filter and output the image-processed input image. Alternatively, the image processing module 310 may change the data type so that the image-processed input image corresponds to the input format of the module after the image processing module 310.

When information regarding the type of the input image is received, the memory 110 may provide the NPU 330 with the first artificial intelligence model corresponding to the type of the input image from among the plurality of first artificial intelligence models.

Meanwhile, FIG. 3 illustrates an embedded system performing a neural network operation in software using the NPU 330, but the present disclosure is not limited thereto. For example, the embedded system may be implemented in hardware through a digital circuit design such as Register-Transfer Level (RTL). When using a single artificial intelligence model, it is more advantageous to implement the embedded system in RTL in terms of power or speed.

However, according to an embodiment, a plurality of first artificial intelligence models and the second artificial intelligence model are required, and the plurality of first artificial intelligence models and the second artificial intelligence model may have different structures or may have different weights even if there have the same structure. In other words, in the case of using various artificial intelligence models alternately, it would be more advantageous to perform an operation in software using the NPU 330 than using RTL. In particular, the NPU 330 may have better performance and efficiency than other processing units due to an accelerator specialized for a neural network operation.

Figure 4A:
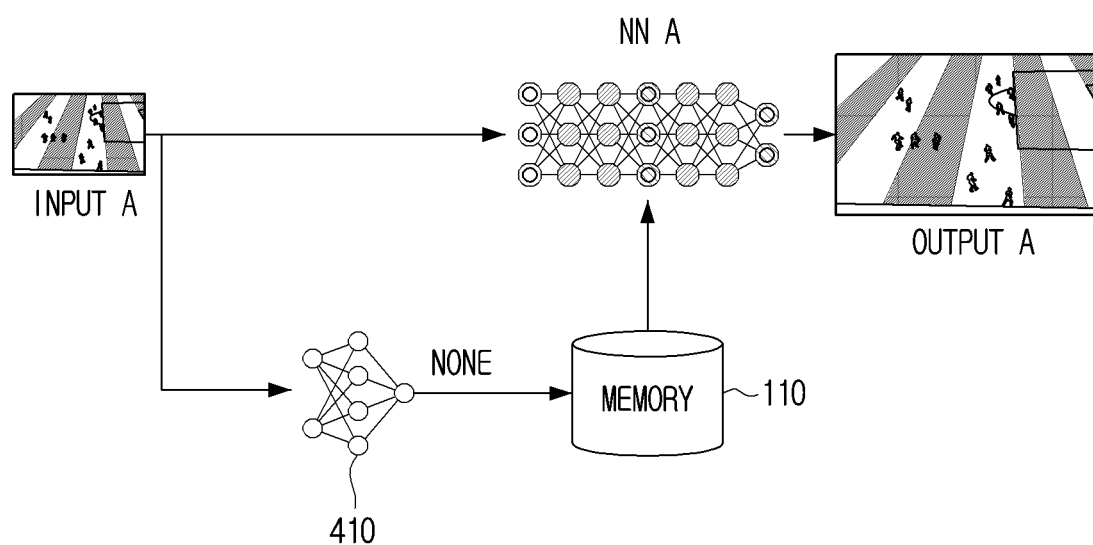
FIG. 4A is a view provided to explain an operation of a processor based on an image type according to an embodiment.
Figure 4B:
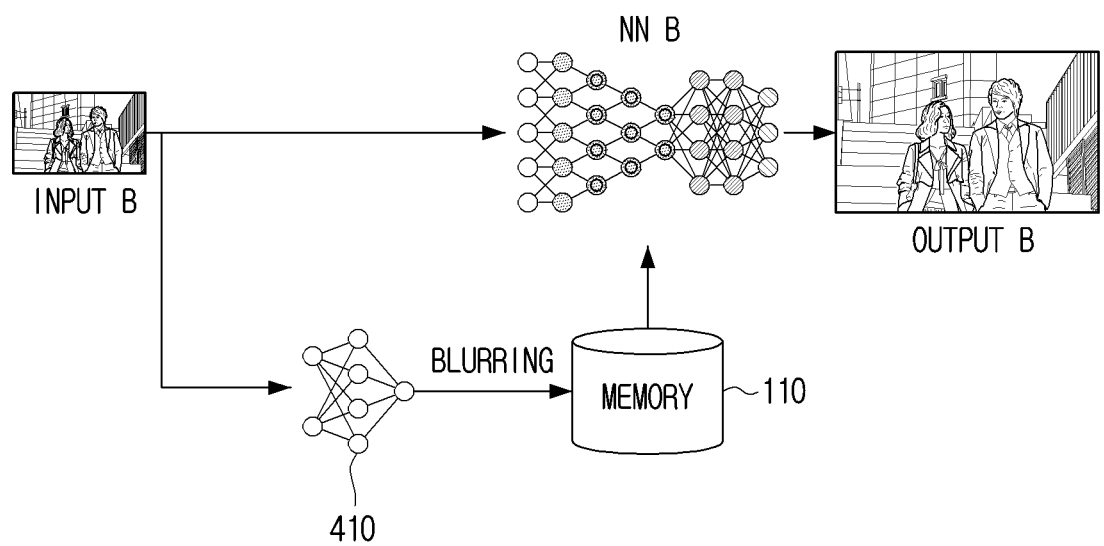
FIG. 4B is a view provided to explain an operation of a processor based on an image type according to an embodiment.

FIGS. 4A and 4B are views provided to explain an operation of the processor 120 according to an image type according to an embodiment. For convenience of explanation, FIGS. 4A and 4B describe that upscaling of an input image is performed, and the type of the image corresponds to one of none or blurring.

As illustrated in FIG. 4A, if the type of the input image is identified as none, the processor 120 may process the input image by inputting the input image to the first artificial intelligence model A (NN A).

Alternatively, as illustrated in FIG. 4B, if the type of the input image is identified as blurring, the processor 120 may process the input image by inputting the input image to the first artificial intelligence model B (NN B). In this case, the result output by the first artificial intelligence model B (NN B) may be in a state in which blurring is minimized. For example, the input image may have less blurring when it is input to the first artificial intelligence model B (NN B) than when it is input to the first artificial intelligence model A (NN A).

Figure 5A:
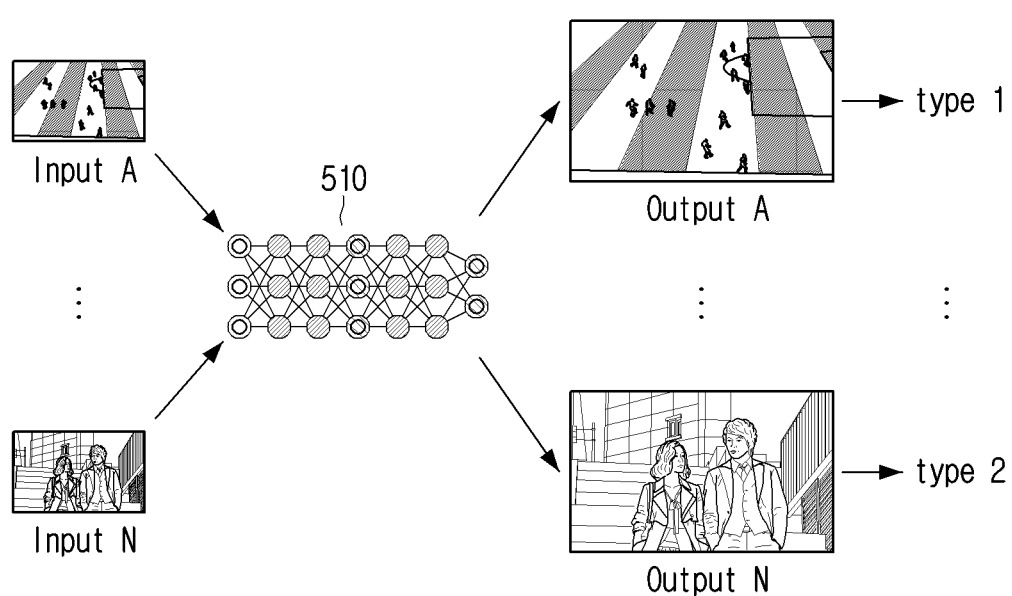
FIG. 5A is a view provided to explain a training method of a plurality of first artificial intelligence models and second artificial intelligence models according to an embodiment.
Figure 5B:
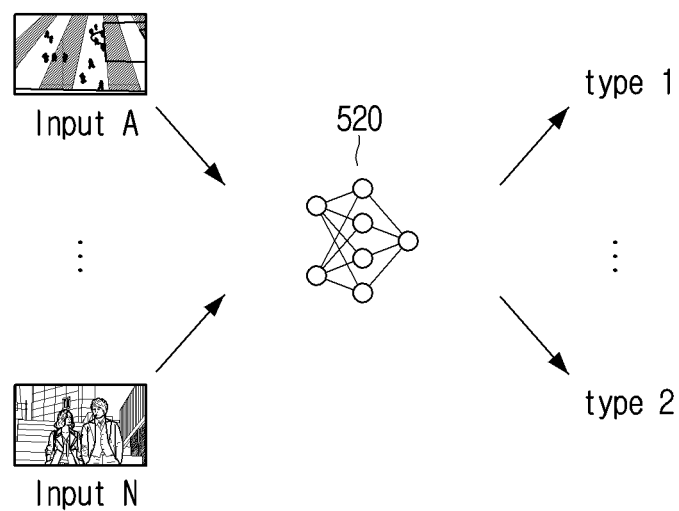
FIG. 5B is a view provided to explain a training method of a plurality of first artificial intelligence models and second artificial intelligence models according to an embodiment.
Figure 5C:
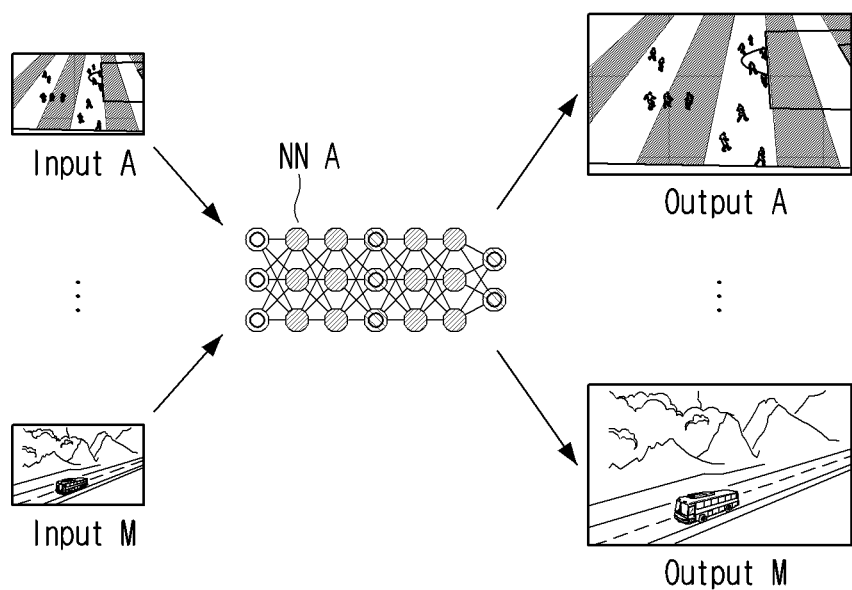
FIG. 5C is a view provided to explain a training method of a plurality of first artificial intelligence models and second artificial intelligence models according to an embodiment.
Figure 5C:
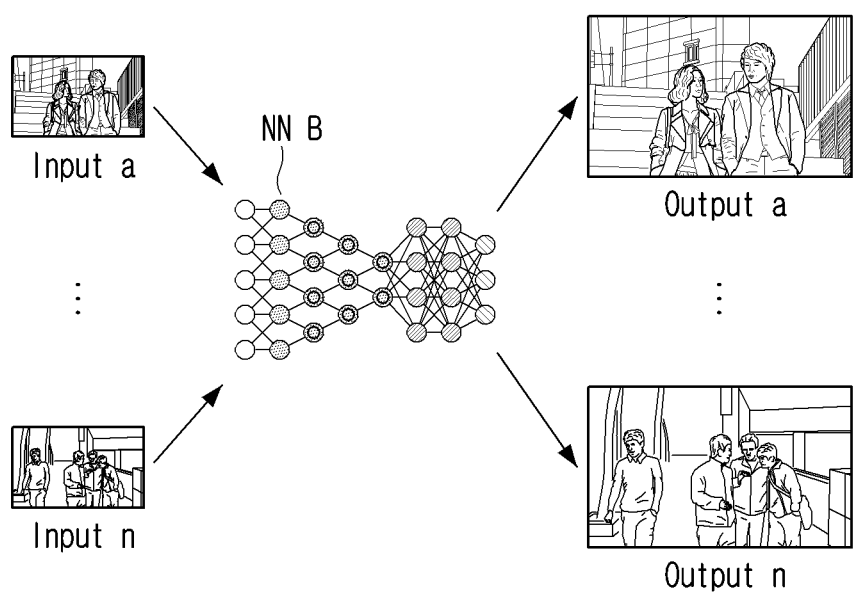

FIGS. 5A to 5C are views provided to explain a learning method of a plurality of first artificial intelligence models and the second artificial intelligence model according to an embodiment. For convenience of explanation, FIGS. 5A to 5C describe that upscaling of the input image is performed, a server learns the plurality of first artificial intelligence models and the second artificial intelligence model, and the input image corresponds to one of two types.

First of all, FIG. 5A is a view illustrating that a plurality of sample images (Input A—Input N) are input to one 510 of the plurality of first artificial intelligence models to obtain a plurality of up-scaled sample images (Output A—Output N), and the type of each of the plurality of up-scaled sample images (Output A—Output N) is identified. Here, one 510 of the plurality of first artificial intelligence models may be an artificial intelligence model obtained by learning through an artificial intelligence algorithm to perform up-scaling regardless of the type and hereinafter, for convenience of explanation, one 510 of the plurality of first artificial intelligence models will be described as a basic artificial intelligence model 510.

For example, the basic artificial intelligence model 510 may be obtained by learning a relationship between a plurality of sample images and an original image corresponding to each sample image through an artificial intelligence algorithm. Here, the plurality of sample images may be in a state in which there is no distinction between types.

A server may identify the type of the input image by comparing the output of the basic artificial intelligence model 510 regarding a plurality of sample images with the corresponding original images. For example, the server may identify that blurring has occurred by comparing the first sample image with the corresponding original image.

The server may store a plurality of sample images and an image type corresponding to each sample image.

As illustrated in FIG. 5B, the server may train the second artificial intelligence model 520 using sample images which are classified according to types. For example, the server may input sample images which belong to the first type (type 1) and the second type (type 2) to the second artificial intelligence model 520, and train the second artificial intelligence model 520 so that the second artificial intelligence model 520 outputs an identifier corresponding to each type. However, the server is not limited thereto, and may input sample images which belong to the first type (type 1) to the second artificial intelligence model 520, input sample images which belong to the second type (type 2) to the second artificial intelligence model 520, and train the second artificial intelligence model 520 so that an identifier corresponding to the second type is output.

After the training of the second artificial intelligence model 520 is completed, when the input image is input to the second artificial intelligence model 520, the second artificial intelligence model 520 may output an identifier corresponding to the type of the input image.

As illustrated in FIG. 5C, the server may train one of the first artificial intelligence models for each type. For example, the first artificial intelligence model A (NN A) corresponding to the first type may be obtained by learning a relationship between sample images (Input A—Input M) belonging to the first type and an original image corresponding to each sample image through an artificial intelligence algorithm, and the first artificial intelligence model B (NN B) corresponding to the second type may be obtained by learning a relationship between sample images (Input a—Input n) belonging to the second type and an original image corresponding to each sample image through an artificial intelligence algorithm.

In FIG. 5C, it is described that both the first artificial intelligence model A (NN A) and the first artificial intelligence model B (NN B) are trained, but the present disclosure is not limited thereto. For example, if the first type is none, the learning of the first artificial intelligence model A (NN A) may be omitted and the basic artificial intelligence model 510 may be used. In this case, only the first artificial intelligence model (NN B) regarding the second type may be trained. Alternatively, if the first type is none, the basic artificial intelligence model 510 may be trained and updated with respect to a relationship between sample images belonging to the first type and an original image corresponding to each sample image through an artificial intelligence algorithm. The training of the first artificial intelligence model B (NN B) may be performed in the same manner.

Through the above-described method, a plurality of first artificial intelligence models and the second artificial intelligence model may be obtained.

FIG. 6 is a view provided to explain real time computation according to an embodiment.

As described above, the second artificial intelligence model may be implemented in a simpler structure than the plurality of first artificial intelligence models, and the input image may also be down-scaled and input to the second artificial intelligence model.

In particular, FIG. 6 illustrates a processing speed when the second artificial intelligence model is an Inception model or a Mobilenet model.

For example, if the second artificial intelligence model is implemented as an Inception model and an NPU operating at 840 MHz and having a specific structure is used, it is possible to identify the type of the input image at a speed of 154 frames per second (fps).

In general, in the case of the electronic apparatus 100, especially an electronic apparatus having a display, several frames of an image may be stored in the memory of the final display module. This is because a decoder or internal image quality processing modules may not be able to process one frame within a specific period (e.g., 30 hertz (Hz), 60 Hz, 120 Hz). In other words, in order to ensure continuity of the screen, several frames image-processed in advance are stored in a buffer, and the electronic apparatus may display them according to a specific period. Therefore, when the type of the input image is identified at the speed as illustrated in FIG. 6, real-time performance may be secured.

Figure 7:
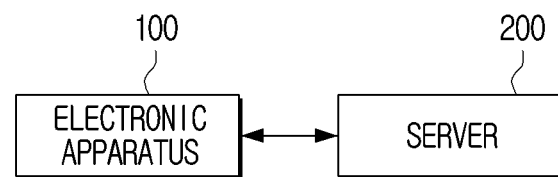
FIG. 7 is a view provided to explain an update of a plurality of first artificial intelligence models and a second artificial intelligence model according to an embodiment.

FIG. 7 is a view provided to explain an update of a plurality of first artificial intelligence models and a second artificial intelligence model according to an embodiment.

First of all, a server 200 may be an apparatus for training the plurality of first artificial intelligence models and the second artificial intelligence model. The server 200 may train the plurality of first artificial intelligence models and the second artificial intelligence model using the methods as illustrated in FIGS. 5A to 5C.

The server 200 may provide the electronic apparatus 100 with the plurality of first artificial intelligence models and the second artificial intelligence model of which training is completed. The electronic apparatus 100 may receive the plurality of first artificial intelligence models and the second artificial intelligence model of which training is completed from the server 200 via the communication interface.

As illustrated in FIG. 2, the electronic apparatus 100 may perform image processing with respect to the input image. The electronic apparatus 100 may obtain a weighted value of a plurality of types related to the input image in the process of identifying the type of the input image. In addition, if at least one of the weighted values of the plurality types is equal to or greater than a threshold value, the electronic apparatus 100 may store the input image and the at least one weighted value.

As such, the electronic apparatus 100 may accumulatively store the input image of which weighted value is equal to or greater than a threshold value from among input images which are input sequentially and information regarding the weighted value.

The electronic apparatus 100 may provide the sever 200 with information regarding the input images and the weighted value corresponding to each input image which is stored accumulatively at at least one of: predetermined time intervals or when the electronic apparatus 100 is turned on.

The server 200 may update the plurality of first artificial intelligence models and the second artificial intelligence model based on the information received from the electronic apparatus 100, and provide the electronic apparatus 100 with the updated plurality of first artificial intelligence models and second artificial intelligence model.

As additional learning is performed with the input image of which weighted value is equal to or greater than a threshold value as described above, the second artificial intelligence model may distinguish each type more clearly, and the plurality of first artificial intelligence models may be more specialized in image processing for each type.

Figure 8:
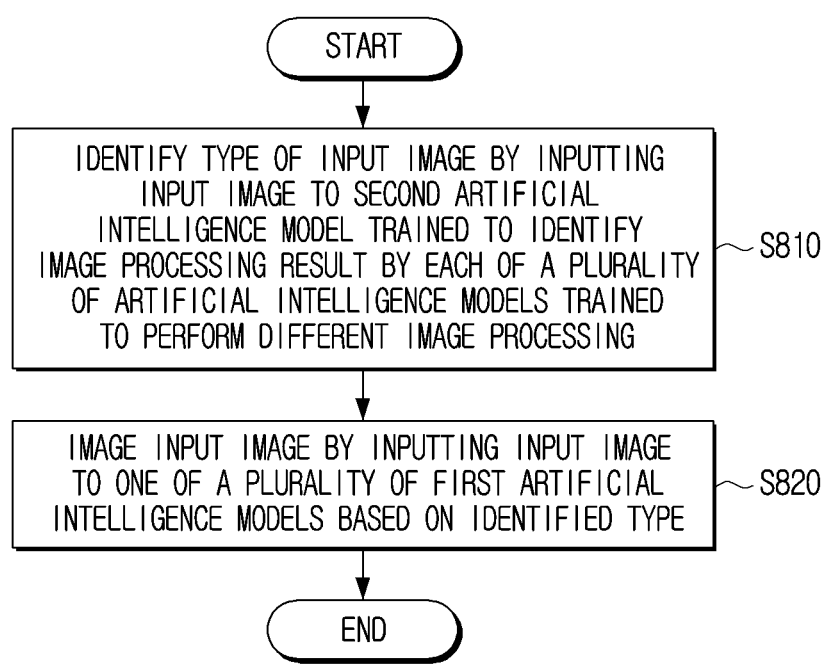
FIG. 8 is a flowchart provided to explain a controlling method of an electronic apparatus according to an embodiment.

FIG. 8 is a flowchart provided to explain a controlling method of an electronic apparatus according to an embodiment.

First of all, the type of an input image may be identified by inputting the input image to the second artificial intelligence model trained to identify the type of the image by predicting the image processing result by a plurality of first artificial intelligence models trained to perform different image processing. (Operation S810). The input image may be processed by inputting the input image to one of the plurality of first artificial intelligence models based on the identified type (Operation S820).

Here, the step of down-scaling the resolution of the input image is further included, and the step of identifying (Operation S810) may include identifying the type of the input image by inputting the down-scaled image to the second artificial intelligence model.

The step of down-scaling may include, if the size of the input image is greater than a predetermined size, down-scaling the input image.

Meanwhile, the second artificial intelligence model may be an artificial intelligence model obtained by learning a relationship between a plurality of sample images and the type corresponding to each sample image through an artificial intelligence algorithm, and each of the plurality of first artificial intelligence models may be an artificial intelligence model obtained by learning a relationship between the sample image of the type corresponding to each of the plurality of first artificial intelligence modules from among the plurality of sample images and the original image corresponding to the sample image through an artificial intelligence algorithm.

Here, the type corresponding to each sample image may be obtained by processing each of the plurality of sample images by inputting each of the plurality of sample images to one of the plurality of first artificial intelligence models and may be obtained based on the type of the side effect of each of the plurality of processed sample images.

The type of the side effect may include at least one of none, jagging, blurring, aliasing, or noise boosting.

Meanwhile, the step of processing may include at least one of up-scaling processing, noise removing processing or detail enhancement processing of the input image.

In addition, the step of processing (Operation S820) may include obtaining a weighted value regarding a plurality of types related to the input image by inputting the input image to the second artificial intelligence model and identifying the type having the largest weighted value from among the plurality of types as the type of the input image.

Here, if at least one of the weighted values regarding the plurality of types is equal to or greater than a threshold value, the step of storing the input image and the at least one weighted value may be further included.

Meanwhile, the operation of identifying (Operation S810) may include identifying the type of the input image by inputting the input image to the second artificial intelligence model by the processing unit of the electronic apparatus which may operate based on an operating system, and the operation of processing (Operation S820) may include processing the input image by inputting the input image to one of the plurality of first artificial intelligence models based on the identified type by the NPU of the electronic apparatus.

According to the various embodiments of the present disclosure, the electronic apparatus may identify the type of an input image using an artificial intelligence model, and improve processing performance of the input image by processing the input image using another artificial intelligence model corresponding to the identified type.

The above-described various embodiments of the disclosure may be implemented as software including instructions that may be stored in machine-readable storage media (e.g., a transitory media, such as, a signal wave, or a non-transitory computer readable medium), which can be read by a machine (e.g., a computers). The machine may refer to an apparatus that calls instructions stored in a storage medium, and that can operate according to the called instructions. The apparatus may include an electronic apparatus (e.g., an electronic apparatus (A)) according to the embodiments described in the disclosure. When an instruction is executed by a processor, the processor may perform a function corresponding to the instruction by itself, or by using other components under its control. The instruction may include a code that is generated or executed by a compiler or an interpreter. The storage medium that is readable by machine may be provided in the form of a non-transitory storage medium. Here, the term 'non-transitory' only means that a storage medium does not include signals, and is tangible, but does not indicate whether the storage medium is non-volatile or volatile (data is stored in the storage medium semi-permanently or temporarily).

In addition, according to an embodiment of the disclosure, the method according to the various embodiments described above may be provided while being included in a computer program product. A computer program product refers to a product, and it can be traded between a seller and a buyer. The computer program product can be distributed on-line in the form of a storage medium that is readable by machines (e.g., a compact disc read only memory (CD-ROM)), or through an application store (e.g., Google Play™ store). In the case of on-line distribution, at least a portion of the computer program product may be stored in a storage medium such as the server of the manufacturer, the server of the application store, and the memory of the relay server at least temporarily, or may be generated temporarily.

In addition, according to an embodiment of the disclosure, the aforementioned various embodiments of the disclosure may be implemented in a computer or a recording medium that can be read by an electronic device (e.g., a computer) by using software, hardware or a combination thereof In some cases, the embodiments described in this disclosure may be implemented as a processor itself. Meanwhile, according to implementation by software, the embodiments such as procedures and functions described in this disclosure may be implemented as separate software modules. Each of the software modules may perform one or more functions and operations described in this disclosure.

Meanwhile, computer instructions for performing processing operations of devices according to the aforementioned various embodiments of the disclosure may be stored in a non-transitory computer-readable medium. When computer instructions stored in such a non-transitory computer-readable medium are executed by the processor of a specific device, processing operations at devices according to the aforementioned various embodiments are made to be performed by the specific device. A non-transitory computer-readable medium refers to a medium that is physical/tangible. A non-transitory computer-readable medium may store data semi-permanently, and may be readable by machines. The non-transitory computer-readable medium may be different from a register, a cache, and a memory. As specific examples of a non-transitory computer-readable medium, there may be a compact disc (CD), a digital versatile disc (DVD), a hard disc, a blue-ray disc, a universal serial bus (USB), a memory card, a read-only memory (ROM) and the like.

Also, each of the components according to the aforementioned various embodiments (e.g., a module or a program) may comprise or consist of a singular object or a plurality of objects. In addition, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

While preferred embodiments of the disclosure have been shown and described, the disclosure is not limited to the aforementioned specific embodiments, and it is apparent that various modifications can be made by those having ordinary skill in the art, without departing from the gist of the disclosure as claimed by the appended claims, and such modifications are not to be interpreted independently from the technical idea or prospect of the disclosure.

What is claimed is:

1. An electronic apparatus comprising:
   a memory that stores first information regarding a plurality of first artificial intelligence models trained to perform image processing differently from each other and second information regarding a second artificial intelligence model trained to identify a type of an image by predicting a processing result of the image by each of the plurality of first artificial intelligence models;
   a communication interface; and
   a processor configured to:
      obtain a weighted value regarding a plurality of types related to an input image by inputting the input image to the second artificial intelligence model stored in the memory,
      identify a type having a largest weighted value from among the plurality of types as a type of the input image,
      process the input image by inputting the input image to one of the plurality of first intelligence models stored in the memory based on the identified type,
      accumulatively store the input image of which weighted value is equal to or greater than a threshold value and information regarding the weighted value,
      control the communication interface to transmit the input image of which weighted value is equal to or greater than the threshold value and the information regarding the weighted value to a server at at least one of predetermined time intervals or when the electronic apparatus is turned on, and
      receive an updated plurality of first artificial intelligence models and an updated second artificial intelligence model from the server through the communication interface,
   wherein the second artificial intelligence model is an artificial intelligence model obtained by training a relationship between a plurality of sample images and a type corresponding to each sample image through an artificial intelligence algorithm,
   wherein the type corresponding to each sample image is obtained by processing each of the plurality of sample images by inputting each of the plurality of sample images to one of the plurality of first artificial intelligence models, and obtained based on a type of a side effect of each of the processed plurality of sample images, and
   wherein the type of the side effect includes jagging and aliasing.

2. The electronic apparatus as claimed in claim 1, wherein the processor is further configured to down-scale a resolution of the input image and identify the type of the input image by inputting the down-scaled input image to the second artificial intelligence model.

3. The electronic apparatus as claimed in claim 2, wherein the processor is further configured to, based on a size of the input image being equal to or greater than a predetermined size, down-scale the input image and identify the type of the input image by inputting the down-scaled input image to the second artificial intelligence model.

4. The electronic apparatus as claimed in claim 1,
   wherein each of the plurality of first artificial intelligence models is an artificial intelligence model obtained by training a relationship between a sample image of a type corresponding to each of the plurality of first artificial intelligence models from among the plurality of sample images and an original image corresponding to the sample image through an artificial intelligence algorithm.

5. The electronic apparatus as claimed in claim 1, wherein the type of the side effect further includes at least one of blurring, or noise boosting.

6. The electronic apparatus as claimed in claim 1, wherein the processing the input image includes at least one of up-scaling processing, noise removing processing or detail enhancement processing.

7. The electronic apparatus as claimed in claim 1, wherein the processor includes a central processing unit (CPU) and a Neural Processing Unit (NPU) which operate based on an Operating System,
   wherein the CPU is configured to identify the type of the input image by inputting the input image to the second artificial intelligence model, and
   wherein the NPU is configured to process the input image by inputting the input image to one of the plurality of first artificial intelligence models based on the identified type.

8. A method of controlling an electronic apparatus storing first information regarding a plurality of first artificial intelligence models trained to perform image processing differently from each other and second information regarding a second artificial intelligence model trained to identify a type of an image by predicting a processing result of the image by each of the plurality of first artificial intelligence models, the method comprising:
   obtaining a weighted value regarding a plurality of types related to an input image by inputting the input image to the second artificial intelligence model,
   identifying a type having a largest weighted value from among the plurality of types as a type of the input image;
   processing the input image by inputting the input image to one of the plurality of first artificial intelligence models based on the identified type;
   accumulatively storing the input image of which weighted value is equal to or greater than a threshold value and information regarding the weighted value, transmitting the input image of which weighted value is equal to or greater than the threshold value and the information regarding the weighted value to a server at at least one of predetermined time intervals or when the electronic apparatus is turned on, and receiving an updated plurality of first artificial intelligence models and an updated second artificial intelligence model from the server, wherein the second artificial intelligence model is an artificial intelligence model obtained by training a relationship between a plurality of sample images and a type corresponding to each sample image through an artificial intelligence algorithm, wherein the type corresponding to each sample image is obtained by processing each of the plurality of sample images by inputting each of the plurality of sample images to one of the plurality of first artificial intelligence models, and obtained based on a type of a side effect of each of the processed plurality of sample images, and wherein the type of the side effect includes jagging and aliasing.

9. The method as claimed in claim 8, further comprising:
down-scaling a resolution of the input image,
wherein the identifying comprises identifying the type of the input image by inputting the down-scaled input image to the second artificial intelligence model.

10. The method as claimed in claim 9, wherein the down-scaling comprises, based on a size of the input image being equal to or greater than a predetermined size, down-scaling the input image.

11. The method as claimed in claim 8,
wherein each of the plurality of first artificial intelligence models is an artificial intelligence model obtained by training a relationship between a sample image of a type corresponding to each of the plurality of first artificial intelligence models from among the plurality of sample images and an original image corresponding to the sample image through an artificial intelligence algorithm.

12. The method as claimed in claim 8, wherein the type of the side effect further includes at least one of blurring, or noise boosting.

13. The method as claimed in claim 8, wherein the processing the input image includes at least one of up-scaling processing, noise removing processing or detail enhancement processing.

14. The method as claimed in claim 8, wherein the identifying comprises identifying the type of the input image by inputting the input image to the second artificial intelligence model by a central processing unit (CPU) of the electronic apparatus which operates based on an Operating System, and wherein the processing comprises processing the input image by inputting the input image to one of the plurality of first artificial intelligence models based on the identified type by a Neural Processing Unit (NPU) of the electronic apparatus.

15. The electronic apparatus as claimed in claim 1, wherein the plurality of first artificial intelligence models and the second artificial intelligence model are updated by the server to provide the updated plurality of first artificial intelligence models and the updated second artificial intelligence model.

16. The method as claimed in claim 8, wherein the plurality of first artificial intelligence models and the second artificial intelligence model are updated by the server to provide the updated plurality of first artificial intelligence models and the updated second artificial intelligence model.

* * * * *